(12) United States Patent
Huie

(10) Patent No.: US 9,537,669 B2
(45) Date of Patent: Jan. 3, 2017

(54) SELECTIVE MULTICAST

(71) Applicant: Avaya Inc., Santa Clara, CA (US)

(72) Inventor: Gary Huie, Orinda, CA (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/927,068

(22) Filed: Oct. 29, 2015

(65) Prior Publication Data

US 2016/0191262 A1  Jun. 30, 2016

Related U.S. Application Data

(63) Continuation of application No. 13/666,963, filed on Nov. 1, 2012, now Pat. No. 9,178,710.

(51) Int. Cl.
| | |
|---|---|
| *H04L 12/18* | (2006.01) |
| *H04L 12/46* | (2006.01) |
| *H04L 12/743* | (2013.01) |

(52) U.S. Cl.
CPC ....... *H04L 12/1886* (2013.01); *H04L 12/4641* (2013.01); *H04L 12/4662* (2013.01); *H04L 12/4679* (2013.01); *H04L 45/7457* (2013.01)

(58) Field of Classification Search
USPC .............. 370/235, 254, 256, 270, 312, 390, 392,370/401, 432
See application file for complete search history.

(56) References Cited

U.S. PATENT DOCUMENTS

| | | | |
|---|---|---|---|
| 2003/0165140 | A1 | 9/2003 | Tang et al. |
| 2008/0279184 | A1* | 11/2008 | He ...................... H04L 12/1863 370/390 |
| 2009/0187941 | A1 | 7/2009 | Smith |
| 2010/0080238 | A1 | 4/2010 | Allan et al. |
| 2011/0090819 | A1 | 4/2011 | Zheng |
| 2012/0201244 | A1 | 8/2012 | Ou et al. |

* cited by examiner

*Primary Examiner* — Edan Orgad
*Assistant Examiner* — Saumit Shah

(57) ABSTRACT

A method, system and computer readable medium for selective multicast processing. The method can include obtaining, using one or more processors, an association between a multicast data stream and a service identifier. The method can also include programming, using the one or more processors, a classification engine with a match that classifies a VLAN. The method can further include receiving, at the one or more processors, a data stream, and classifying, using the one or more processors, the data stream based on a mapping to a source virtual port. The method can also include deriving, using the one or more processors, a service identifier from the source virtual port.

12 Claims, 3 Drawing Sheets

SELECTIVE MULTICAST

CROSS-REFERENCE TO RELATED APPLICATIONS

This application is a continuation of U.S. application Ser. No. 13/666,963 filed Nov. 1, 2012, the disclosure of which is expressly incorporated herein by reference in its entirety.

TECHNICAL FIELD

Embodiments relate generally to computer networks, and more particularly, to methods, systems and computer readable media for selective multicast transmission of data in a network.

BACKGROUND

In some network environments, such as Provider Back Bone (PBB), the multicast traffic replication decisions are handled by the end points such as Backbone Edge Bridge (BEB) switch. BEBs may traditionally listen to both unicast and multicast traffic based on the same Service Instance Identifier (ISID) domain which by default is based on a CVLAN domain to ISID relationship. Thus, there can be bandwidth waste in the Backbone Core Bridge (BCB) cloud due to multicast traffic not being pruned early.

Some conventional systems may not have a built-in (or preprogrammed) mechanism to achieve segregation of the multicast traffic, which may be due in part to these systems having been designed with very traditional PBB ideas in mind. For example, some conventional systems assign the ISID based on the initial classification, which is not expected to be changed later in the hardware pipeline. Thus, any idea of a staged classification approach that changes will likely not work.

Embodiments were conceived in light of the above-mentioned problems and limitations, among other things.

SUMMARY

One or more embodiments can include a method for selective multicast processing. The method can include obtaining, using one or more processors, an association between a data stream and a service identifier. The method can also include programming, using the one or more processors, a classification engine with a match that classifies a VLAN. The method can further include receiving, at the one or more processors, a data stream, and classifying, using the one or more processors, the data stream based on a mapping to a source virtual port. The method can also include deriving, using the one or more processors, a service identifier from the source virtual port.

The method can also include processing the data stream based on the service identifier obtained as a result of the deriving. The data stream can be an (S,G) multicast data stream.

The one or more processors can include a network communication chip. The network communication chip can include any third party vendor chip which supports Mac in Mac (MiM), which is the basis for PBB, such as a Broadcom Apollo family chip, or any CPU (or processor) used as a network forwarding processing element which can be used in this application.

The method can also include selectively multicasting a data packet based on the derived service identifier.

Embodiments can include a system having one or more processors coupled to a nontransitory computer readable medium having stored thereon software instructions that, when executed by the one or more processors, cause the one or more processors to perform a series of operations.

The operations can include obtaining an association between a data stream and a service identifier. The operations can also include programming a classification engine with a match that classifies a VLAN. The operations can further include receiving a data stream and classifying the data stream based on a mapping to a source virtual port. The operations can also include deriving a service identifier from the source virtual port. The operations can also include selectively multicasting a data packet based on the deriving.

The operations can also include processing the data stream based on the service identifier obtained as a result of the deriving. The data stream can include an (S,G) multicast data stream.

The system can include a network communication chip. The network communication chip can include a Broadcom Apollo family chip or other third party vendor chip which supports Mac in Mac (MiM).

Embodiments can include a nontransitory computer readable medium having stored thereon software instructions that, when executed by a processor, cause the processor to perform a series of operations.

The operations can include obtaining an association between a data stream and a service identifier. The operations can also include programming a classification engine with a match that classifies a VLAN. The operations can further include receiving a data stream and classifying the data stream based on a mapping to a source virtual port. The operations can also include deriving a service identifier from the source virtual port.

The operations can also include processing the data stream based on the service identifier obtained as a result of the deriving. The data stream can include an (S,G) multicast data stream.

The system can include a network communication chip. The network communication chip can include a Broadcom Apollo family chip.

The operations can also include selectively multicasting a data packet based on the deriving.

DETAILED DESCRIPTION

In general, embodiments can selectively prune receivers of an (S,G) multicast stream by ISID when using a third party chip (e.g., a Broadcom chip having mac-in-mac capabilities, such as an Apollo family device). Embodiments can use TLVs which have been designed to prune the receivers of an (S,G) multicast stream based on multicast unique ISIDs.

The chip hardware classification pipeline may need to classify first the CVLAN (Customer VLAN), which will eventually derive an ISID. The pruning action associated with a specific (S,G) flow does not happen until much later in the HW pipeline. By the time this happens, one cannot change the value of the ISID information.

Embodiments can include a VLAN classification engine (which may be provided by a chip maker with the chipset that is being used). The VLAN classification engine can be a filter rule based one.

Some implementations can include a mechanism for a two stage pruning operation of the (S,G) receivers. A first stage pruning operation can be performed at the end BEBs based on the multicast ISID that the BEBs are listening for. The second stage pruning operation is the normal PBB style one at the end point BEBs.

In order to accomplish the first stage pruning operation, one or more embodiments can isolate the (S,G) by ISID. This can be done by utilizing the VLAN classification engine to create a filter rule for each (S,G) and to eventually derive an ISID for each (S,G) multicast stream.

Figure 1:
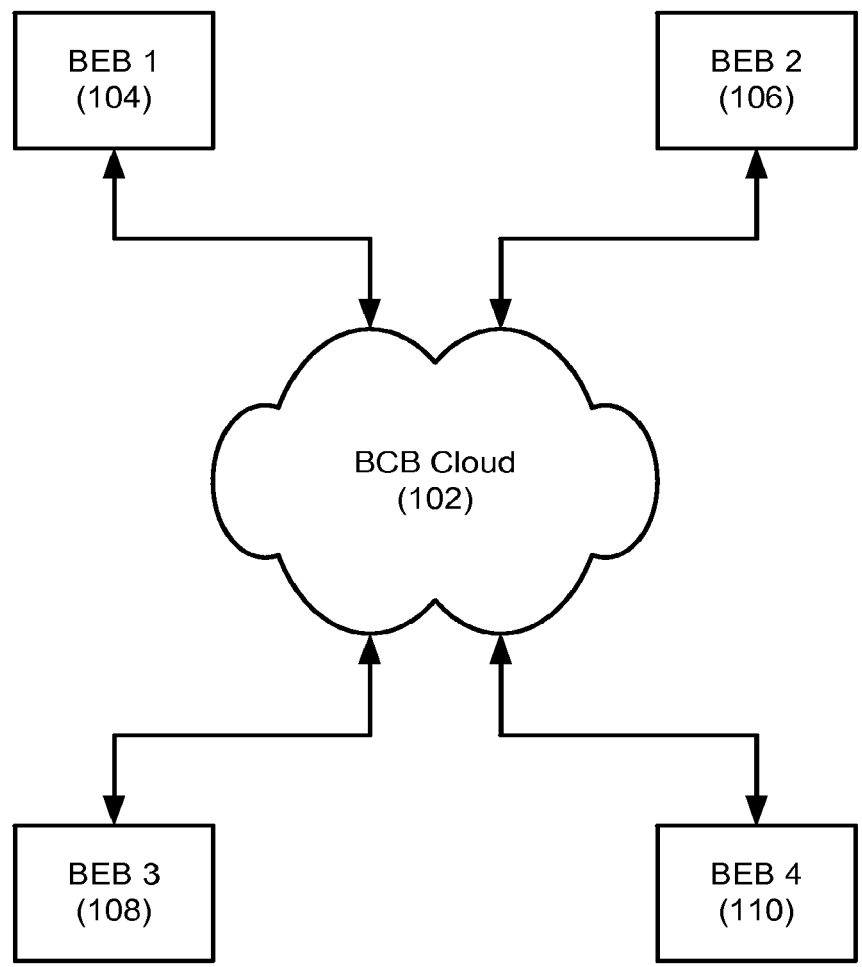
FIG. 1 is a diagram of an example network in accordance with at least one embodiment.

As shown in FIG. 1, a network 100 includes a Backbone Core Bridge (BCB) cloud 102, and a plurality of Backbone Edge Bridges (BEBs) 104-110. In operation, multicast traffic may be sent into the BCB cloud 102 based on ISID and may be pruned by an endpoint BEB. Typically, the ISIDs are based on a CVLAN to ISID mapping at the BEB and not on an (S, G) mapping. All unicast and multicast traffic is sent on the ISID even though a specific BEB may not be interested.

For example, BEB 1 104 may have an (S,G) multicast stream that it needs to send out to all BEBs (e.g., 106-110) on ISID 100 and all three BEBs are interested in both unicast and multicast traffic for ISID 100. In this example, only BEB 3 108 may be interested in the (S,G) multicast stream.

In conventional designs, the traffic will go from BEB 1 104 to all three of the other BEBs (106-110). The other BEBs can decide during NNI to UNI termination that they are not interested in the traffic. Once BEB 3 108 receives the traffic, it may still need to prune the multicast traffic for traffic that it locally terminates on its CVLAN side.

This can create a situation in which bandwidth may be wasted due to needless multicast replications that are happening in the BCB cloud 102. Also, endpoint BEB resources such as receive buffers and processor bandwidth may be wasted handling multicast traffic that ends up being dropped. Some conventional hardware is not factory equipped to handle an association between an (S,G) multicast stream and an ISID.

Figure 2:
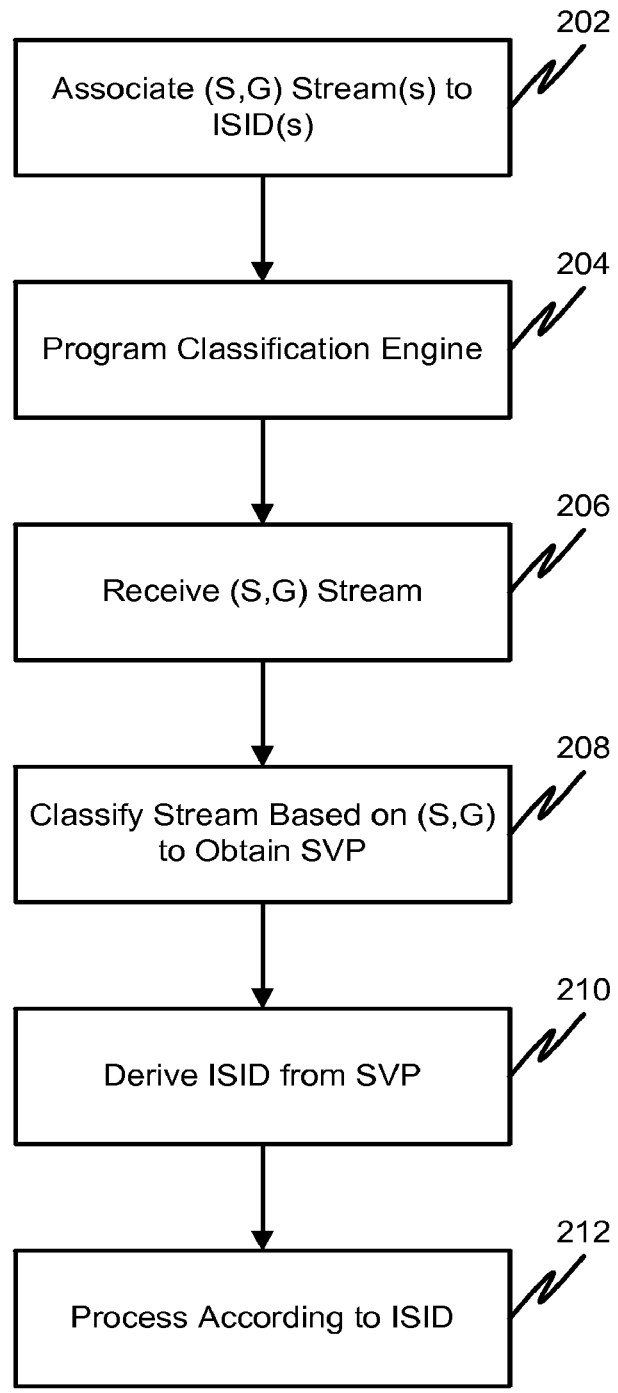
FIG. 2 is a flow chart showing an example method for selective multicast egress processing in accordance with at least one embodiment.

FIG. 2 is a flowchart of an example method for selective multicast processing (e.g., L2 and/or L3), that this BEB is sending to the cloud. For purposes of illustrating example systems and structural elements, FIG. 1 can serve as a reference for the description below regarding FIG. 2.

As shown in FIG. 2, processing beings at 202, where an association is established between one or more (S,G) multicast streams and one or more corresponding ISIDs. The association can be received from another system, retrieved from memory, automatically configured or configured by a user. Processing continues to 204.

At 204, a classification engine is programmed. For example, a classification engine such as the VCAP or VFP of a Broadcom chip in a BEB (e.g., 104-110) can be programmed for a specific (S,G) match that classifies a VLAN. In conventional systems, a VLAN classification to an ISID association would occur without consideration of an (S, G) classification. Processing continues to 206.

Steps 202 and 204 can be part of the functions performed by a control plane, while the following steps can be performed by a data plane.

At 206, an (S,G) multicast stream is received at a BEB (e.g., 104-110) from the CVLAN side of the BEB. Processing continues to 208.

At 208, the BEB classifies the stream based on (S,G) to a Source Virtual Port (SVP) and the CVLAN. Processing continues to 210.

At 210, the BEB derives an ISID from the SVP. Processing continues to 212.

At 212, the BEB processes the stream based on the ISID.

It will be appreciated that 202-212 can be repeated in whole or in part (e.g., 202 to 204 can be repeated when new multicast streams need to be segregated by ISID, while 206 to 212 can be repeated for existing multicast streams).

Figure 3:
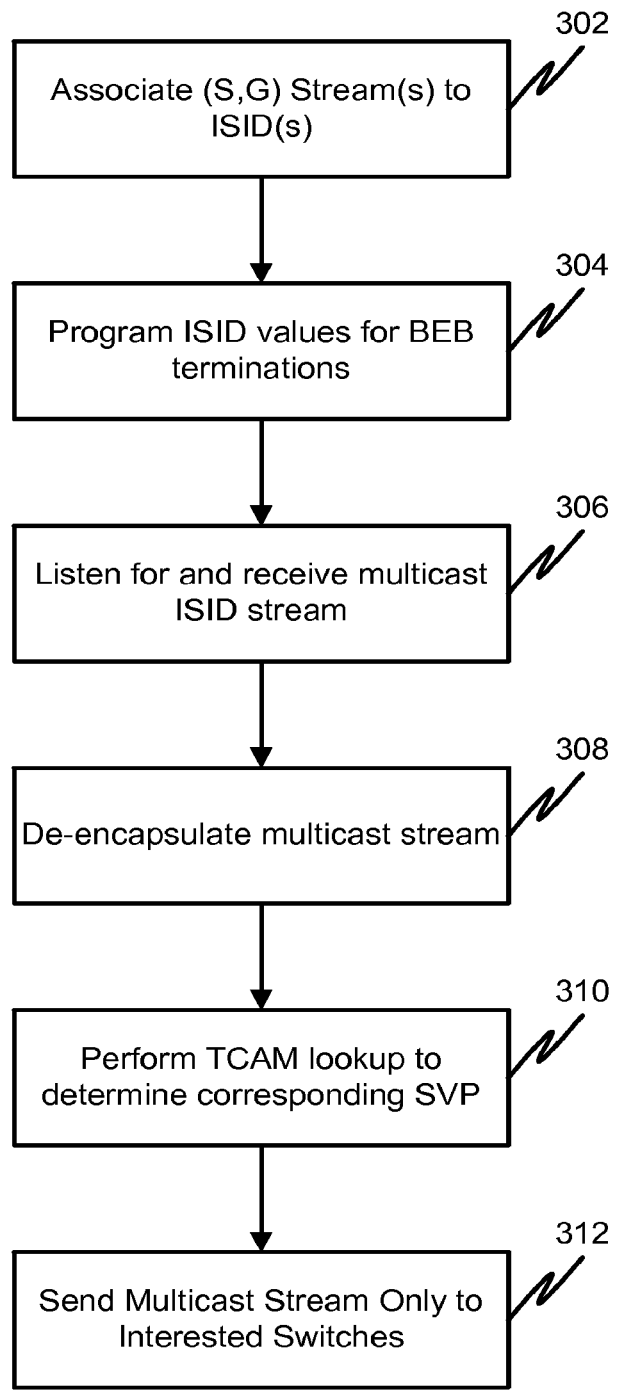
FIG. 3 is a flow chart showing an example method for selective multicast ingress processing in accordance with at least one embodiment.

FIG. 3 is a flowchart of an example method for selective multicast processing, of multicast traffic from the BCB cloud for ISIDs that this BEB is listening for. For purposes of illustrating example systems and structural elements, FIG. 1 can serve as a reference for the description below regarding FIG. 3.

As shown in FIG. 3, processing beings at 302, where an association is established at a BEB (e.g., 104-110) between one or more (S,G) multicast streams and one or more corresponding ISIDs. The association can be received from another system, retrieved from memory, automatically configured or configured by a user. Processing continues to 304.

At 304, a classification engine in the BEB is programmed. For example, PBB based ISID termination look up logic can be established. Processing continues to 306.

Steps 302 and 304 can be part of the functions performed by a control plane, while the following steps can be performed by a data plane.

At 306, the BEB is listening for ISIDs that concern the BEB and determine that a multicast ISID of interest is received at the BEB (e.g., 104-110). Processing continues to 308.

At 308, the BEB de-encapsulates the MiM according to the corresponding multicast unique ISID and CVLAN. Processing continues to 310.

At 310, during the de-encapsulation process, a multicast stream will have an (S,G) TCAM lookup to decide which SVP to send the stream to. Processing continues to 312.

At 312, the BEB sends the stream only to interested switches based on the ISID corresponding to the (S,G) matching. Multicast pruning can occur based on the TCAM lookup.

It will be appreciated that 302-312 can be repeated in whole or in part.

It will be appreciated that the modules, processes, systems, and sections described above can be implemented in hardware, hardware programmed by software, software instructions stored on a nontransitory computer readable medium or a combination of the above. A system for selective multicast processing, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for selective multicast processing.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method for selective multicast processing, the method comprising:
    establishing, at a backbone edge bridge (BEB), using one or more processors, an association between source address, group address (S, G) information of a data stream and a service instance identifier (ISID);
    programming, using the one or more processors, a classification engine in the BEB with a match that classifies a Virtual Local Area Network (VLAN), wherein the match includes a specific source address, group address (S, G) match that classifies a VLAN;
    listening, at the BEB, for a multicast ISID of interest to the BEB;
    determining that a multicast ISID of interest to the BEB is received at the BEB;
    de-encapsulating a mac-in-mac message from the multicast ISID of interest according to a corresponding multicast unique ISID and VLAN, wherein the de-encapsulating includes performing an (S,G) ternary content-addressable memory (TCAM) lookup to decide which source virtual port (SVP) to send the data stream to; and
    sending, from the BEB, the data stream to interested switches based on the ISID corresponding to the (S,G) matching.

2. The method of claim 1, wherein the data stream is an (S,G) multicast data stream.

3. The method of claim 1, wherein the one or more processors includes a network communication chip.

4. The method of claim 3, wherein the network communication chip is a chip having mac-in-mac capabilities.

5. A system comprising:
    one or more processors coupled to a nontransitory computer readable medium having stored thereon software instructions that, when executed by the one or more processors, cause the one or more processors to perform operations including:
    establishing, at a backbone edge bridge (BEB), using the one or more processors, an association between source address, group address (S, G) information of a data stream and a service instance identifier (ISID);
    programming, using the one or more processors, a classification engine in the BEB with a match that classifies a Virtual Local Area Network (VLAN), wherein the match includes a specific source address, group address (S, G) match that classifies a VLAN;
    listening, at the BEB, for a multicast ISID of interest to the BEB;
    determining that a multicast ISID of interest to the BEB is received at the BEB;
    de-encapsulating a mac-in-mac message from the multicast ISID of interest according to a corresponding multicast unique ISID and VLAN, wherein the de-encapsulating includes performing an (S,G) ternary content-addressable memory (TCAM) lookup to decide which source virtual port (SVP) to send the data stream to; and sending, from the BEB, the data stream to interested switches based on the ISID corresponding to the (S,G) matching.

6. The system of claim 5, wherein the data stream is an (S,G) multicast data stream.

7. The system of claim 5, wherein the one or more processors includes a network communication chip.

8. The system of claim 7, wherein the network communication chip is a chip having mac-in-mac capabilities.

9. A nontransitory computer readable medium having stored thereon software instructions that, when executed by one or more processors, cause the one or more processors to perform operations including:

establishing, at a backbone edge bridge (BEB), using the one or more processors, an association between source address, group address (S, G) information of a data stream and a service instance identifier (ISID);

programming, using the one or more processors, a classification engine in the BEB with a match that classifies a Virtual Local Area Network (VLAN), wherein the match includes a specific source address, group address (S, G) match that classifies a VLAN;

listening, at the BEB, for a multicast ISID of interest to the BEB;

determining that a multicast ISID of interest to the BEB is received at the BEB;

de-encapsulating a mac-in-mac message from the multicast ISID of interest according to a corresponding multicast unique ISID and VLAN, wherein the de-encapsulating includes performing an (S,G) ternary content-addressable memory (TCAM) lookup to decide which source virtual port (SVP) to send the data stream to; and sending, from the BEB, the data stream to interested switches based on the ISID corresponding to the (S,G) matching.

10. The nontransitory computer readable medium of claim 9, wherein the data stream is an (S,G) multicast data stream.

11. The nontransitory computer readable medium of claim 9, wherein the one or more processors includes a network communication chip.

12. The nontransitory computer readable medium of claim 11, wherein the network communication chip is a chip having mac-in-mac capabilities.

* * * * *